United States Patent
Taninecz

[11] 3,764,174
[45] Oct. 9, 1973

[54] VEHICLE BUMPER
[76] Inventor: Demetro Taninecz, 1012 Draughon Ave., Nashville, Tenn. 37204
[22] Filed: Jan. 10, 1972
[21] Appl. No.: 216,562

[52] U.S. Cl. ............ 293/98, 188/1 C, 72/705, 29/421
[51] Int. Cl. ............ B60r 19/04, B23p 17/00
[58] Field of Search ............ 293/1, DIG. 3, 70, 293/71 P, 71 R, 98; 213/1 A; 188/1 C; 72/61, 705 K; 29/401, 421

[56] References Cited
UNITED STATES PATENTS
2,748,455  6/1956  Draper et al. .................. 29/421
3,338,614  8/1967  Sadler, Jr. ...................... 293/70
1,584,081  5/1926  Douglass ........................ 293/71 R
3,024,525  3/1962  Wisberger ....................... 29/421
3,575,251  4/1971  Moore ........................... 293/1

Primary Examiner—Gerald M. Forlenza
Assistant Examiner—Robert Saifer
Attorney—Harrington A. Lackey

[57] ABSTRACT

A hollow vehicle bumper having a thin wall of crushable material enclosing a space, and valve means for introducing fluid under pressure into the space to restore the thin wall to substantially its original shape after it has been crushed.

5 Claims, 4 Drawing Figures

PATENTED OCT 9 1973　　　　　　　　　　　　3,764,174

3,764,174

VEHICLE BUMPER

BACKGROUND OF THE INVENTION

This invention relates to a vehicle bumper, and more particularly to a hollow vehicle bumper of crushable material.

Heretofore vehicle bumpers have been made of solid steel, solid rubber, and even hollow rubber. In each case, the resistance of the bumper to impact has been based primarily on the elasticity of the material. It is true, of course, that a steel bumper upon great impact will be permanently deformed, requiring considerable skill and equipment for straightening or restoring the bumper to its original shape.

SUMMARY OF THE INVENTION

It is an object of this invention to provide a vehicle bumper made of a material which is not substantially elastic, but which is crushable and which may be easily restored, in situ, by the application of fluid pressure to its original shape.

The bumper made in accordance with this invention is an elongated hollow member having a relatively thin wall of crushable material completely enclosing an interior space occupied by a fluid medium such as air, other gases or liquid. Upon sufficient impact, the wall of the bumper member is crushed or deformed to absorb the energy of the impact, but is without elastic properties. A valve is preferably formed in the wall of the member. Fluid under pressure is introduced through the valve to the interior space so that the pressure within the interior space is increased sufficiently that the crushed wall will be restored substantially to its original shape. For certain then wall material, air can be supplied to the interior space through a conventional tire valve by means of a tire pump. After the wall is restored to its original shape, the pressurized fluid may be bled from the interior space until atmospheric pressure is restored within the hollow bumper member. Of course, the pressure of the fluid medium within the interior space will determine the degree of deformation of the wall upon impact. The energy absorbed by the deformation of the wall is transmitted to the fluid medium by compression.

DESCRIPTION OF THE PREFERRED EMBODIMENT

Figure 2:
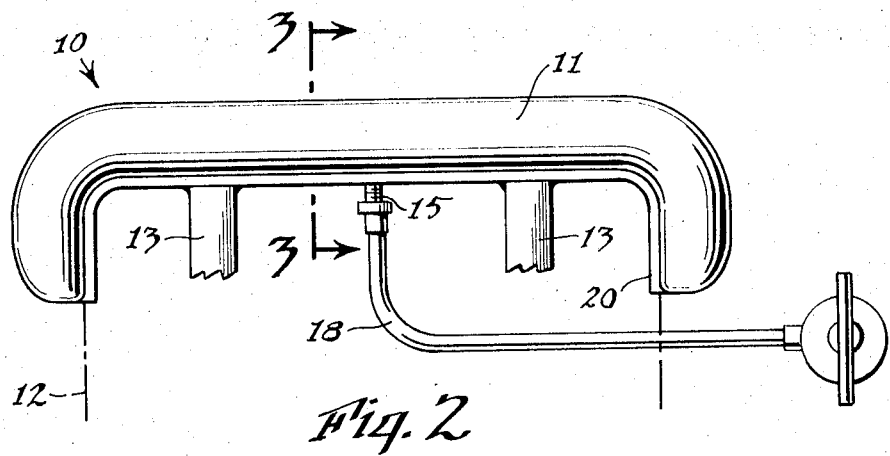
FIG. 2 is a top plan view of the bumper of FIG. 1 with the front end of the automobile disclosed in phantom, and a tire pump hose connected to the valve for forcing compressed air into the hollow bumper.

Referring now to the drawings in more detail, the bumper 10 made in accordance with this invention is disclosed in the drawings as an elongated hollow element or member having a wall 11. The rear portion of the bumper 10 may be fixed to an elongaged stiffener bar 20, which in turn may be fixed, by welding or otherwise, to frame members 13 on the front end of an automobile 12.

Although the wall 11 is disclosed as having a circular cross-section, nevertheless the shape of the cross-section may vary. The wall 11 is thin relative to the overall dimension or diameter of the bumper 10 and completely encloses the interior space 14.

The wall 11 is crushable, because it is not only thin, but it is also made of a material such as steel, which will deform upon impace but is not sufficiently elastic to automatically restore itself to its original shape.

The interior space 14 is adapted to contain a fluid, such as air, other gases or liquid, particularly under pressure. The fluid medium is introduced into the interior space 14 by means of a fluid valve, such as air valve 15, extending through wall 11.

The air check valve 15 is preferably a conventional tire valve having a spring-biased closure valve and stem to automatically close the valve 15 when the stem is released. When the stem, not shown, is depressed, the valve 15 is open to permit introduction of compressed air, or to release pressurized air from the interior space 14.

A typical bumper 10 has a circular tube wall 11 made of steel having an outer diameter approximately 8 inches and a wall thickness of approximately 0.063 inches.

By attaching the bumper 10 to the front end of an automobile 12 by the fixed frame members 13, as illustrated in the drawings, the bumper 10 is adapted to replace the existing front end bumper. Initially, the interior space 14 is not pressurized, and contains air at approximately atmospheric pressure.

Figures 3, 4:
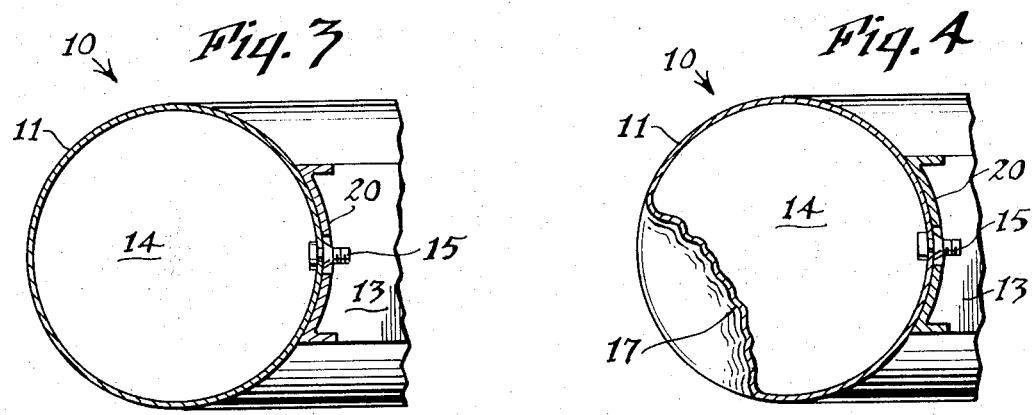
FIG. 3 is an enlarged section taken along the line 3—3 of FIG. 2.
FIG. 4 is a view similar to FIG. 3, disclosing the bumper wall crushed after impact.
Figure 1:
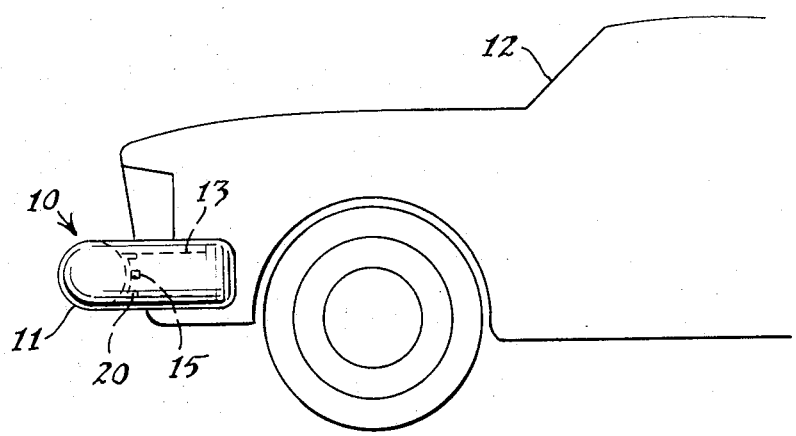
FIG. 1 is a side elevation of a vehicle bumper made in accordance with this invention fixed to the front end of an automobile.

If the bumper member 10 should bump into an obstacle with sufficient force, the portion 17 of the wall affected by the impact collapses or is deformed, as disclosed in FIG. 4. Being relatively thin, it does not possess sufficient elastic qualities to permit it to restore itself to its original shape automatically. The crushing or deforming of the wall portion 17 absorbs the energy of the impact and transmits it to the atmospheric air in the interior space 14 by compressing the air. Compression of the air within the space 14 also creates certain resistance to the deformation of the wall portion 17.

As disclosed in FIG. 4, the bumper member 10 has absorbed the shock of the impact by deforming only the wall portion 17 without any injury to the automobile 12.

Instead of taking the automobile 12 to a body shop or service station, the operator of the vehicle merely attachs the outlet end of a tire pump hose 18 (FIG. 2) to the air valve 15 and manually pumps air under compression into the interior space 14. When the pressure of the air within the space 14 increases to a sufficient value, the pressurized fluid will force the deformed wall portion 17 to return to substantially its original shape as disclosed in FIG. 3. After being restored to its original shape, the bumper 10 is ready for further service.

Of course, if the material of the wall 11 is hard enough or it is thick enough not to be restored by air pressurization from a tire pump, then heavier duty air compressors could be used. It is also within the scope of this invention, for heavy duty use, to employ hydraulic fluid instead of compressed air, and to use conventional hydraulic fluid equipment, such as hydraulic pumps and hoses, in order to feed compressed liquid through an appropriate valve to fill the interior space 14 with pressurized hydraulic fluid, to restore the deformed portion 17 to its original shape. Of course, it will be realized that the bumper member 10 could be used on the rear of a vehicle, or its longitudinal shape could be modified so that it could be used on the sides of the vehicle, or even on the interior of the vehicle across the dashboard. The bumper member 10 could also be modified to be used on other types of vehicles, such as a fender for a boat.

After the deformed wall portion 17 has been restored to its original shape by the introduction of compressed air, then the compressed air may be bled through the valve 15 so that high air pressures will not normally be carried within the interior space 14. The air pressures within the interior space 14 should be atmospheric or greater, but generally at a low enough value to permit the wall 11 to deform upon impact in order to absorb the energy of the impact force without undue resistance from a pressurized fluid within the interior space 14. By permitting the bumper wall 11 itself to be crushed, the bumper member 10 abosrbs the majority of the impact energy, while the body of the vehicle 12 absorbs very little of the impact energy.

In view of the high cost of labor and particularly automobile repairs, the economy of a vehicle bumper such as 10 is obvious.

What is claimed is:

1. A vehicle bumper comprising:
   a. a hollow member having a wall of an original shape enclosing a space for receiving fluid,
   b. said wall being thin relative to the cross-sectional dimensions of said hollow member,
   c. said thin wall being of crushable and relatively inelastic material adapted to be deformed upon impact of said thin wall against an external object,
   d. said deformed wall remaining deformed while subject only to the pressure, after impact, of the fluid within said space before impact,
   e. said thin, deformed wall being capable of being restored to substantially its original shape by the increase of pressure within said space to a pressure substantially greater than atmospheric, and substantially greater than said fluid pressure after impact,
   f. check valve means in said wall for the one-way passage of fluid under pressure through said valve means into said space,
   g. means attachable to said check valve means for forcing fluid under pressure substantially greater than atmospheric pressure and substantially greater than said fluid pressure after impact into said space, and against said wall, when deformed, to assume substantially its original shape, and
   h. means attaching said hollow member to a vehicle.

2. The invention according to claim 1 in which the crushable, relatively inelastic, material of said thin wall is metal.

3. The invention according to claim 2 in which said metal is steel.

4. The invention according to claim 1 in which said fluid is air, and said valve means is a releasable air check valve.

5. The invention according to claim 1 in which said hollow member is elongated and said attaching means fixes said hollow member to the exterior body of a vehicle subject to impact.

* * * * *